(12) United States Patent
Kim (10) Patent No.: US 10,644,637 B2
(45) Date of Patent: May 5, 2020

(54) INVERTER SYSTEM FOR VEHICLE

(71) Applicants: Hyundai Motor Company, Seoul (KR); Kia Motors Corporation, Seoul (KR)

(72) Inventor: Beom Sik Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/182,846

(22) Filed: Nov. 7, 2018

(65) Prior Publication Data

US 2020/0059190 A1    Feb. 20, 2020

(30) Foreign Application Priority Data

Aug. 17, 2018  (KR) .................. 10-2018-0095994

(51) Int. Cl.
*H02P 27/08* (2006.01)
*H02M 7/5387* (2007.01)
*B60K 6/22* (2007.10)
*B60L 50/51* (2019.01)

(52) U.S. Cl.
CPC ........ *H02P 27/08* (2013.01); *H02M 7/53871* (2013.01); *B60K 6/22* (2013.01); *B60L 50/51* (2019.02); *B60Y 2200/91* (2013.01); *B60Y 2200/92* (2013.01)

(58) Field of Classification Search
CPC ...... H02P 1/00; H02P 1/04; H02P 1/46; H02P 3/00; H02P 3/16; H02P 3/18; H02P 3/22; H02P 4/00; H02P 5/00; H02P 21/00; H02P 23/00; H02P 27/00; H02P 27/04; H02P 27/06; H02P 6/085; H02P 7/04; H02P 2201/07
USPC .... 318/400.01, 400.26, 400.27, 400.28, 700, 318/701, 721, 727, 799, 800, 801, 430
See application file for complete search history.

(56) References Cited

U.S. PATENT DOCUMENTS 7,071,639 B2    7/2006  Ochiai et al.
7,099,756 B2    8/2006  Sato
7,277,304 B2   10/2007  Stancu et al.
(Continued)

FOREIGN PATENT DOCUMENTS

JP          5104258 B2   12/2012
JP          5851267 B2    2/2016
KR   10-2011-0105034 A    9/2011

*Primary Examiner* — Antony M Paul
(74) *Attorney, Agent, or Firm* — Mintz Levin Cohn Ferris Glovsky and Popeo, P.C.; Peter F. Corless (57) ABSTRACT

An inverter system for a vehicle is provided. The system includes an energy storage that stores electrical energy and a first inverter that includes a plurality of first switching devices and converts energy stored in the energy storage into AC power. A second inverter includes a plurality of second switching devices that are different in types from the first switching devices, and is connected to the energy storage in parallel with the first inverter. The second inverter converts the energy stored in the energy storage into AC power. A motor is driven by the AC power converted by the first inverter and the second inverter. A controller generates a PWM signal based on required output of the motor and operates the motor by inputting the generated PWM signal to at least one or more of the first inverter and the second inverter.

12 Claims, 6 Drawing Sheets

(56) References Cited

U.S. PATENT DOCUMENTS

| | | | |
|---|---|---|---|
| 8,193,743 B2 | 6/2012 | Yamada et al. | |
| 9,024,563 B2 * | 5/2015 | Bunte | F03D 7/0224 |
| | | | 318/494 |
| 9,692,342 B2 * | 6/2017 | Kano | H02P 25/22 |
| 9,834,098 B2 * | 12/2017 | King | B60L 50/51 |
| 9,853,570 B2 * | 12/2017 | Maly | H02M 1/088 |
| 9,917,543 B1 * | 3/2018 | Sarlioglu | H02P 27/08 |
| 10,348,222 B2 * | 7/2019 | Dutta | H02P 29/662 |
| 10,411,532 B2 * | 9/2019 | Lee | H02K 1/246 |
| 2004/0262057 A1 | 12/2004 | Kumar | |
| 2005/0082096 A1 | 4/2005 | Oono | |
| 2010/0013438 A1 * | 1/2010 | Anwar | B60L 58/40 |
| | | | 320/138 |
| 2015/0043254 A1 * | 2/2015 | Preckwinkel | H02M 7/49 |
| | | | 363/41 |
| 2015/0117073 A1 | 4/2015 | Flett | |
| 2017/0250623 A1 * | 8/2017 | Maly | H02M 1/088 |
| 2019/0006979 A1 * | 1/2019 | Suzuki | B62D 5/049 |

* cited by examiner

FIRST PWM SIGNAL AND SECOND PWM SIGNAL NOT SHIFTED

INVERTER SYSTEM FOR VEHICLE

CROSS REFERENCE TO RELATED APPLICATION

The present application claims priority of Korean Patent Application No. 10-2018-0095994 filed on Aug. 17, 2018, the entire contents of which are incorporated herein for all purposes by this reference.

BACKGROUND

1. Field of the Disclosure

The present disclosure relates to an inverter system for a vehicle and, more particularly, to an inverter system for a vehicle that improves efficiency and output by driving an inverter in accordance with required output of a vehicle.

2. Description of the Prior Art

Recently, technologies related to eco-friendly vehicles that use electric energy as power for driving the vehicles have been actively developed to respond to air pollution and exhaustion of oil. An eco-friendly vehicle includes a hybrid electric vehicle, a fuel cell electric vehicle, and an electric vehicle.

Figure 1:
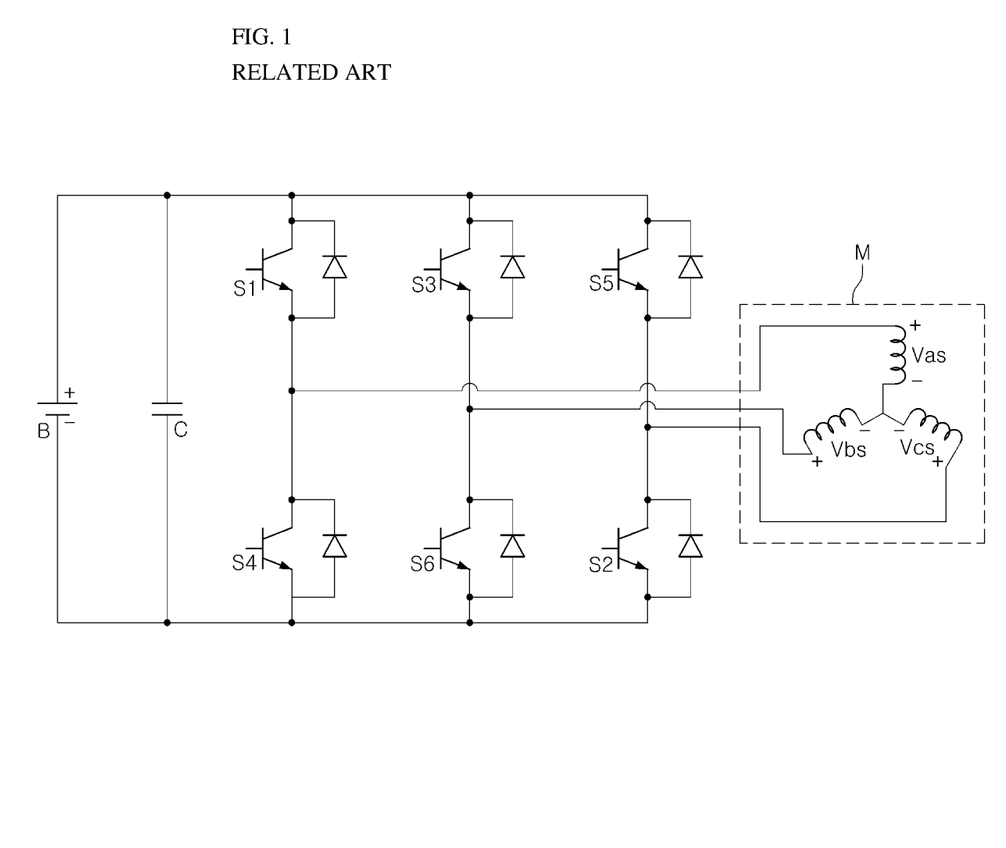
FIG. 1 is a diagram showing an inverter system of the related art.

Meanwhile, as shown in FIG. 1, according to an automotive inverter system for achieving high output in the related art, a motor is driven by connecting a plurality of switching elements S1~S6 in parallel to achieve high output. However, it is possible to achieve high output by connecting a plurality of switching elements in parallel to the motor in the inverter system of the related art, but the entire fuel efficiency of a vehicle may be reduced due to excessive switching and a conduction loss of the switching elements in an eco-driving mode that requires relatively minimal output from a motor.

Recently, research related to a silicon carbide-field effect transistor (SiC-FET) having a minimal loss in an eco-driving mode that requires relatively small minimal from a motor has been actively conducted to solve this problem. However, SiC-FET has is expensive in comparison to Si-IGBT and has poor heat dissipation ability due to the small size thereof, so there is a limit in configuring an inverter by connecting a plurality of SiC-FETs. Accordingly, an inverter system is required capable of employing the advantages of both of a Si-IGBT and a SiC-FET.

SUMMARY

The present disclosure provides an inverter system for a vehicle that improves efficiency and output of a vehicle by driving a motor by generating a pulse width modulation (PWM) signal based on the output of the motor and then inputting the PWM signal to at least one or more of a first inverter and a second inverter.

In accordance with an aspect of the present disclosure, an inverter system for a vehicle that may include: an energy storage configured to store electrical energy; a first inverter having a plurality of first switching devices and configured to convert energy stored in the energy storage into alternating current (AC) power; a second inverter having a plurality of second switching devices that are different in type from the first switching devices, and may be connected to the energy storage in parallel with the first inverter, and configured to convert the energy stored in the energy storage into AC power; a motor driven by the AC power converted by the first inverter and the second inverter; and a controller configured to generate a pulse-width modulation (PWM) signal based on required output of the motor and configured to operate the motor by inputting the generated PWM signal to at least one or more of the first inverter and the second inverter.

The first switching devices may be silicon carbide-field effect transistors (SiC-FET) and the second switching devices may be silicon-insulated gate bipolar transistors (Si-IGBT). The controller may be configured to drive the first inverter by inputting a PWM signal to the first switching devices when the required output of the motor is less than a predetermined reference. The controller may be configured to drive the second inverter by inputting a PWM signal to the second switching devices when the required output of the motor is greater than the predetermined reference.

When the required output of the motor is greater than a predetermined reference, the controller may be configured to drive the first inverter and the second inverter by generating a first PWM signal and a second PWM signal and inputting the first PWM signal to the first switching devices and the second PWM signal to the second switching devices. The controller may be configured to input the first PWM signal to the first switching devices and the second PWM signal to the second switching devices to turn on the second switching devices a predetermined time later than the first switching devices and turn off the second switching devices the predetermined time later than the first switching devices.

The controller may be configured to input the second PWM signal to the first switching devices and the first PWM signal to the second switching devices to turn the first switching devices on a predetermined time later than the second switching devices and off the predetermined time later than the second switching devices. The predetermined time may be ¼ of the cycle of the first PWM signal. The predetermined time may be ¼ of the cycle of the first PWM signal. The first inverter may be smaller in switching and conduction loss than the second inverter. The first inverter may be smaller in rated output for driving the motor than the second inverter.

The motor may be a single motor operated by selectively receiving power converted by the first inverter or power converted by the second inverter in accordance with the required output of the motor or by receiving both of the power converted by the first inverter and the power converted by the second inverter. The motor may include a first motor that is driven by power converted by the first inverter and a second motor that is driven by power converted by the second inverter.

According to the present disclosure, it may be possible to improve efficiency and output of a vehicle by driving a motor by generating a PWM signal based on the output of the motor and then inputting the PWM signal to at least one or more of a first inverter and a second inverter. Further, when the required output of the motor is greater than a predetermined level, it may be possible to reduce direct-current (DC)-link current ripple of the inverter system and accordingly to decrease the manufacturing cost by driving the first inverter and the second inverter by inputting PWM signal having different points of time of turning on/off to the first switching devices and the second switching devices.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

An inverter system for a vehicle according to an exemplary embodiment of the present disclosure is described hereafter with reference to the accompanying drawings.

Figure 2:
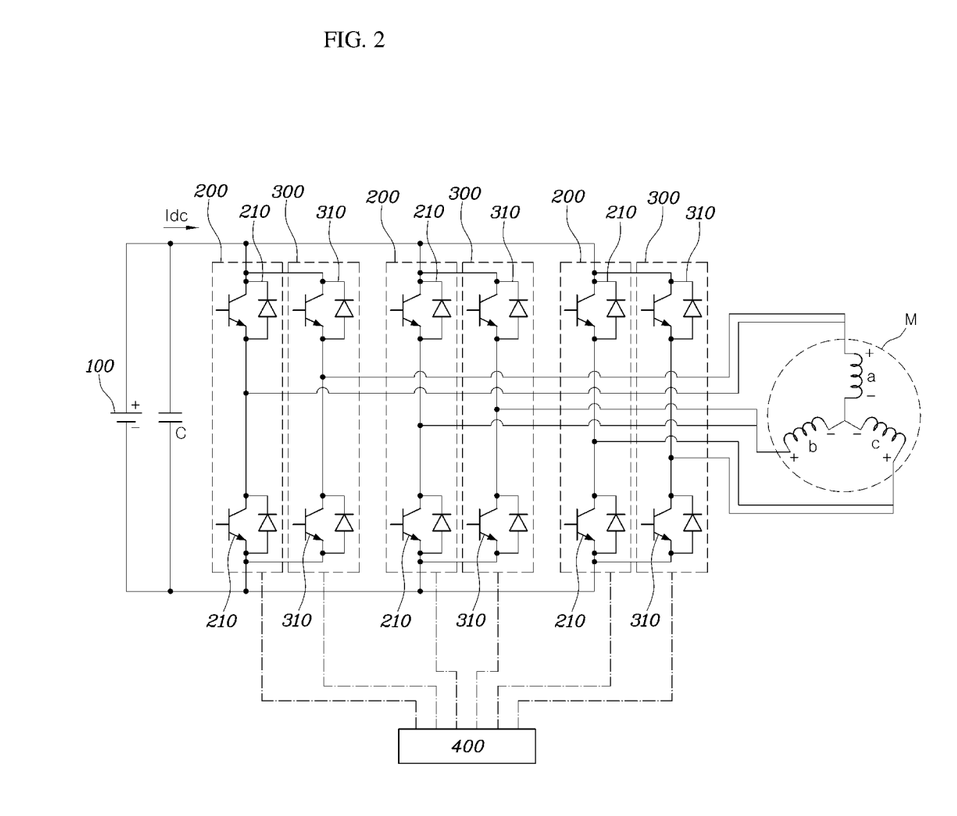
FIG. 2 is a diagram showing an inverter system for a vehicle according to an exemplary embodiment of the present disclosure.

FIG. 2 is a diagram showing an inverter system for a vehicle according to an exemplary embodiment of the present disclosure. As shown in FIG. 2, an inverter system for a vehicle according to the present disclosure may include an energy storage 100, a first inverter 200, a second inverter 300, a motor M, and a controller 400. The detailed configuration of the inverter system for a vehicle according to the present disclosure is described in detail hereafter.

The energy storage 100 may be configured to store electrical energy and provides electrical energy for driving the motor M. Depending on exemplary embodiments, the energy storage 100 may be a battery that stores and provides electrical energy for driving a motor in a vehicle. However, this is merely an exemplary embodiment and various devices, including a supercapacitor, may be used as the energy storage of the present disclosure as long as they may store and provide electrical energy for driving a motor in a vehicle.

The first inverter 200 may include a plurality of first switching devices 210 and configured to convert energy stored in the energy storage 100 into AC power. The first switching devices 210 are, as shown in FIG. 2, connected to one another in parallel and output terminals of the parallel-connected first switching devices 210 may be connected to the phase of the motor. The first switching devices 210 of the first inverter 200 may be configured to convert DC power transmitted from the energy storage 100 into AC power, and conversion of DC power into AC power through an inverter is well known in the art, so it is not described in detail.

The first switching devices may be silicon carbide-field effect transistors (SiC-PET). In the present disclosure, SiC-FETs may be used as the first switching devices since the SiC-FET is much smaller in switching loss and conduction loss under low load than a Si-IGBT. In other words, when required output of a motor is small, it may be possible to reduce a switching loss and a conduction loss by driving the motor M through the first inverter 200 including SiC-FETs, whereby it may be possible to improve the entire fuel efficiency of a vehicle.

The first inverter 200 composed of the first switching devices 210 may be smaller in switching loss and conduction loss than the second inverter 300 to be described below. Further, the first inverter 200 may be smaller in rated output for driving a motor than the second inverter 300. The second inverter 300 may include a plurality of second switching devices 310 that are different in type from the first switching devices 210, and configured to convert the energy stored in the energy storage 100 into AC power. The second switching devices 310 are, as shown in FIG. 2, connected to one another in parallel and output terminals of the parallel-connected second switching devices 310 may be connected to the phase of the motor. The second inverter 300 may be connected to the energy storage 100 in parallel with the first inverter 200.

The second switching devices 310 of the second inverter 300 may be configured to convert DC power transmitted from the energy storage 100 into AC power by being turned on/off by the controller 400 to be described below. Conversion of DC power into AC power through an inverter is well known in the art, so it is not described in detail. The second switching devices 310 may be silicon-insulated gate bipolar transistors (Si-IGBT). It may be possible to achieve high output by connecting Si-IGBTs that are the second switching devices 310 in parallel and driving the motor M through the second inverter 300 including the Si-IGBT in a high-output mode that requires substantial output of a motor.

The motor M may be driven by the AC power converted through the first inverter 200 and the second inverter 300. In other words, the motor M may be driven by the power provided through the first inverter 200 and the second inverter 300, thereby being able to drive a vehicle. The controller 400 may be configured to generate a pulse-width modulation (PWM) signal based on the required output of the motor M and may be configured to operate the motor M by inputting the generated PWM signal into at least one or more of the first inverter 200 and the second inverter 300. The required output of the motor M may be required output of a vehicle. In other words, the controller 400 may be configured to drive the motor M by driving at least one or more of the first inverter 200 and the second inverter 300, depending on an eco-driving mode that requires relative low output for a vehicle and a sports mode or a high-output mode that requires relative high output for a vehicle.

In particular, when the required output of the motor M is less than a predetermined reference, that is, in the eco-driving mode that requires relatively low output for a vehicle, the controller 400 may be configured to drive the first inverter 200 by inputting a PWM signal to the first switching devices 210. In other words, when the required output of the motor M is less than the predetermined reference, the controller 400 may be configured to reduce a switching loss and a conduction loss and accordingly may improve the fuel efficiency of a vehicle by enabling the electrical energy provided from the energy storage 100 to be converted into AC power through the first inverter 200 and then transmitted to the motor M.

Further, when the required output of the motor M is greater than the predetermined reference, that is, in the sports mode or high-output mode that requires relatively high output for a vehicle, the controller 400 may be configured to drive the second inverter 300 by inputting a PWM signal to the second switching devices 310. In other words, when the required output of the motor M is greater than the predetermined reference, the controller 400 may achieve high output by enabling the electrical energy provided from the energy storage 100 to be converted into AC power through the second inverter 300 and then transmitted to the motor M.

Additionally, when the required output of the motor M is greater than the predetermined reference, that is, in the sports mode or high-output mode that requires relatively high output for a vehicle, the controller 400 may be configured to drive the first inverter 200 and the second inverter 300 by generating a first PWM signal and a second PWM signal and then inputting the first PWM signal to the first switching devices 210 and the second PWM signal to the second switching devices 310. In other words, when the required output of the motor M is greater than the predetermined reference, the controller 400 may achieve high output by enabling the electrical energy provided from the energy storage 100 to be converted into AC power through the first inverter 200 and the second inverter 300 and then transmitted to the motor M.

Figure 3:
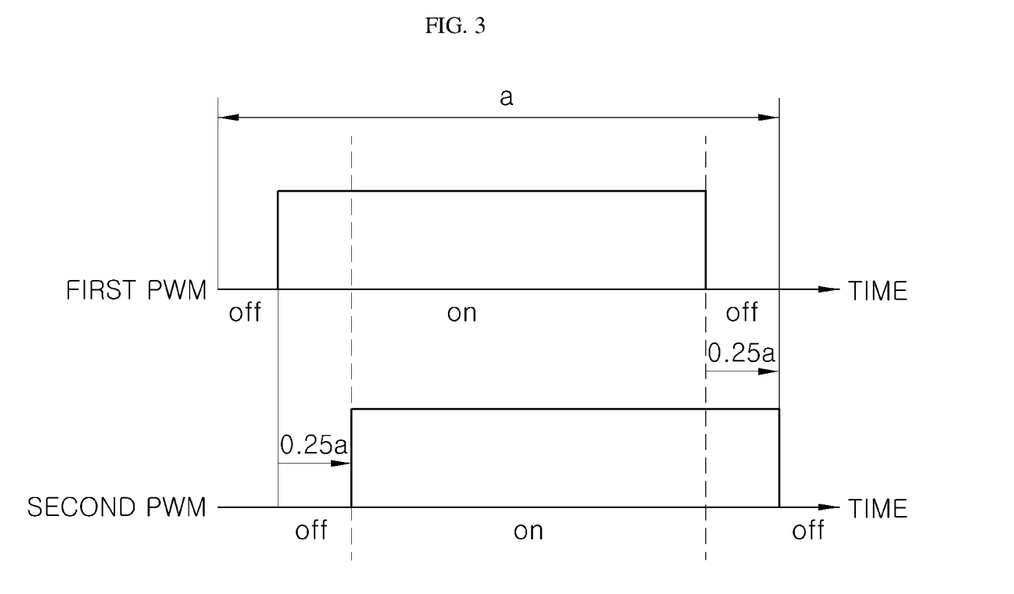
FIG. 3 is a diagram showing a first PWM signal and a second PWM signal that are input to a first inverter and a second inverter when required output of a motor is greater than a predetermined reference in the inverter system for a vehicle according to an exemplary embodiment of the present disclosure.

Referring to FIG. 3 to describe in detail the first PWM signal and the second PWM signal, the second PWM signal may be turned on a predetermined time later than the first PWM signal and may be turned off the predetermined time later than the first PWM signal. Depending on exemplary embodiments, the predetermined time may be ¼ of the cycle of the first PWM signal. In other words, assuming that the cycle of the first PWM signal is 'a' in accordance with an exemplary embodiment, as shown in FIG. 3, the second PWM signal may be turned on 0.25a (¼ of the cycle of the first PWM signal) later than turning-on of the first PWM signal and may be turned off 0.25a (¼ of the cycle of the first PWM signal) later than turning-off of the first PWM signal. Further, though not shown in the figures, according to another exemplary embodiment, the first PWM signal may be turned on a predetermined time later than the second PWM signal and may be turned off later than the second PWM signal. Depending on exemplary embodiments, the predetermined time may be ¼ of the cycle of the first PWM signal.

As described above, when the required output of the motor M is greater than the predetermined reference, the controller 400 may be configured to generate a first PWM signal and a second PWM signal and then input the first PWM signal to the first switching devices 210 and the second PWM signal to the second switching devices 310 to turn on the second switching devices 310 a predetermined time later than the first switching devices 210 and turn off the predetermined time later than the first switching devices 210. Further, according to another exemplary embodiment, when the required output of the motor M is greater than the predetermined reference, the controller 400 may be configured to input the second PWM signal to the first switching devices 210 and the first PWM signal to the second switching devices 310 to turn on the first switching devices 210 a predetermined time later than the second switching devices 310 and to turn off the second switching devices 310 the predetermined time later than the second switching devices 310.

According to the present disclosure, when the required output of the motor M is greater than the predetermined reference, the controller 400 may be configured to drive the first inverter 200 and the second inverter 300 by generating a first PWM signal and a second PWM signal having different points of time of tuning-on/off and then inputting the signals to the first switching devices 210 and the second switching devices 310, whereby it may be possible to reduce current ripple that is generated by operation of an inverter. Accordingly, it may be possible to reduce the material cost of a capacitor C between the energy storage 100 and the first and second inverters 200 and 300.

Figure 4:
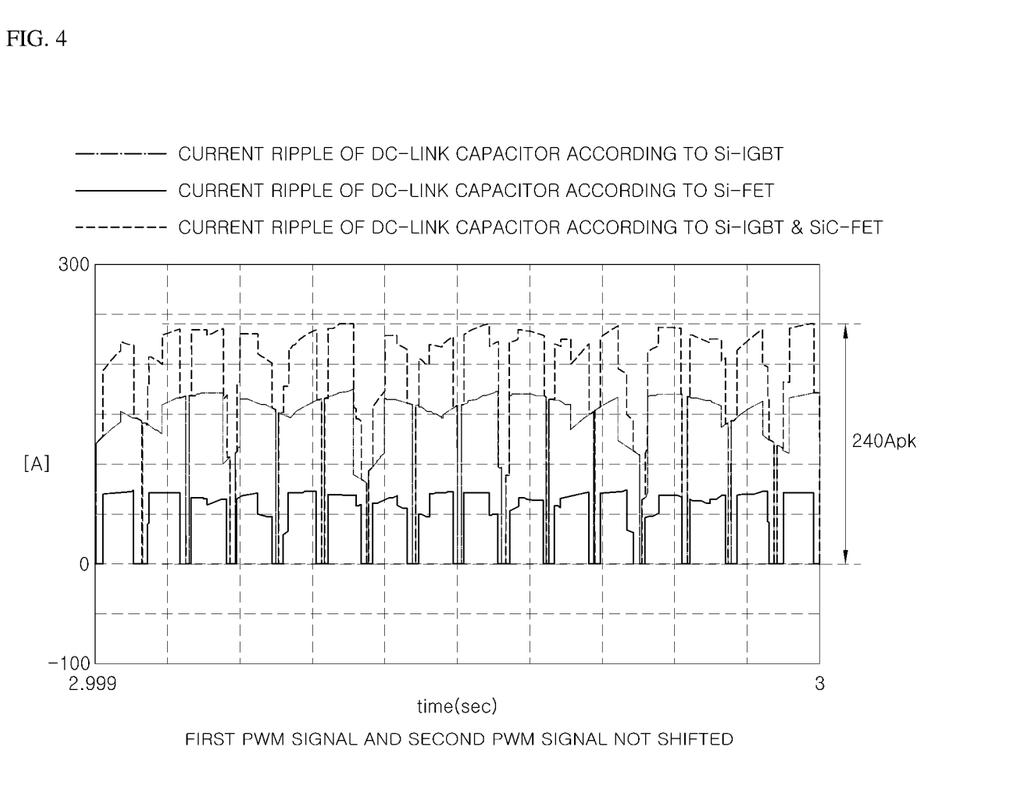
FIG. 4 is a diagram showing a current ripple value of a DC-link capacitor when a first PWM signal and a second PWM signal are not shifted in the inverter system for a vehicle according to an exemplary embodiment of the present disclosure.
Figure 5:
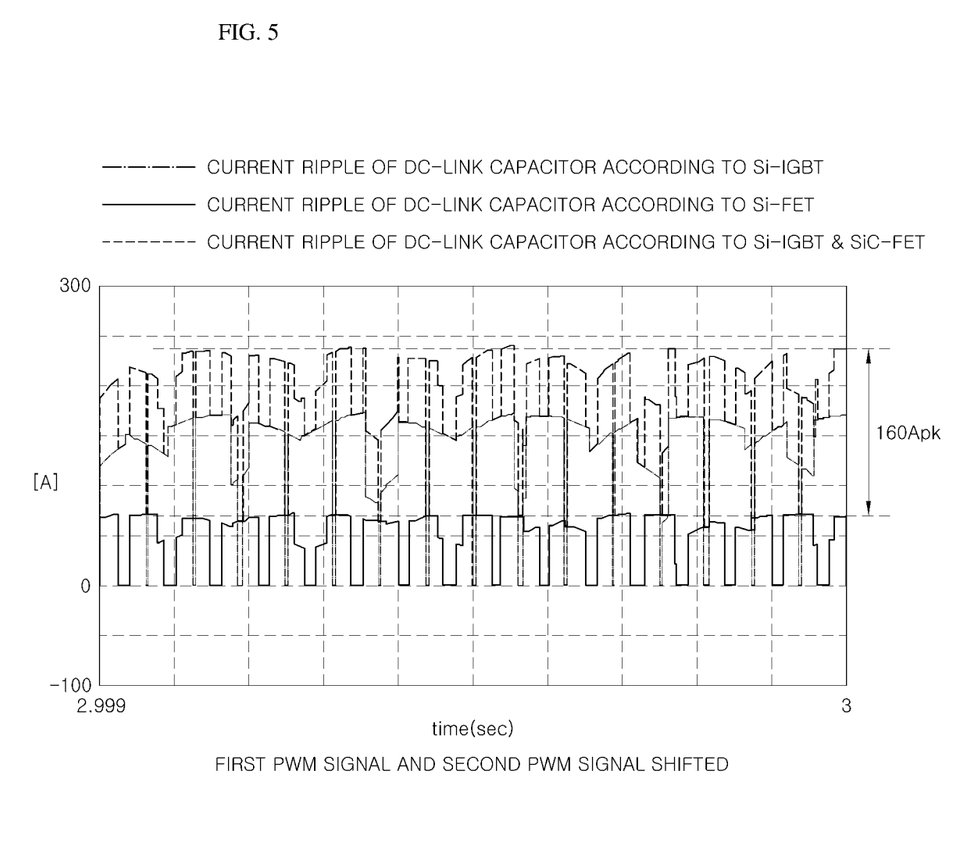
FIG. 5 is a diagram showing a current ripple value of the DC-link capacitor when the first PWM signal and the second PWM signal are shifted in the inverter system for a vehicle according to an exemplary embodiment of the present disclosure.

In particular, referring to FIG. 2, a capacitor C connected in parallel to the energy storage 100 may be disposed between the energy storage 100 and the first and second inverters 200 and 300 in the inverter system for a vehicle according to the present disclosure. The capacitor C prevents a current ripple component from being transmitted to the energy storage 100 by absorbing a current ripple that is generated by operation of the first inverter 200 and the second inverter 300. Referring to FIGS. 3 and 4, according to the present disclosure, since the controller 400 drives the first inverter 200 and the second inverter 300 in the way described above, it may be possible to further reduce the magnitude of current ripple than a first PWM signal and a second PWM signal are input to the first inverter 200 and the second inverter 300 without shifting, and accordingly, it may be possible to reduce the material cost of the capacitor C that absorbs a current ripple component.

Meanwhile, as shown in FIG. 2, the motor M according to an exemplary embodiment of the present disclosure may be a single motor operated by selectively receiving power converted by the first inverter 200 or power converted by the second inverter 300 in accordance with the required output of the motor by the controller 400 or by receiving both of the power converted by the first inverter 200 and the power converted by the second inverter 300. In particular, when the motor M is a 3-phase motor in accordance with an exemplary embodiment, as shown in FIG. 2, the output terminals of the first inverter 200 and the second inverter 300 may be commonly connected to the phases a, b, and c of the motor M, respectively. When the required output of the motor is less than a predetermined reference, the controller 400 may be configured to drive the motor M by operating the first switching devices 210 to drive the first inverter 200. Further, when the required output of the motor is greater than the predetermined reference, the controller 400 may be configured to drive the motor M by operating the second switching devices 310 to drive the second inverter 300 or by operating the first switching devices 210 and the second switching devices 310 to drive the first inverter 200 and the second inverter 300.

Figure 6:
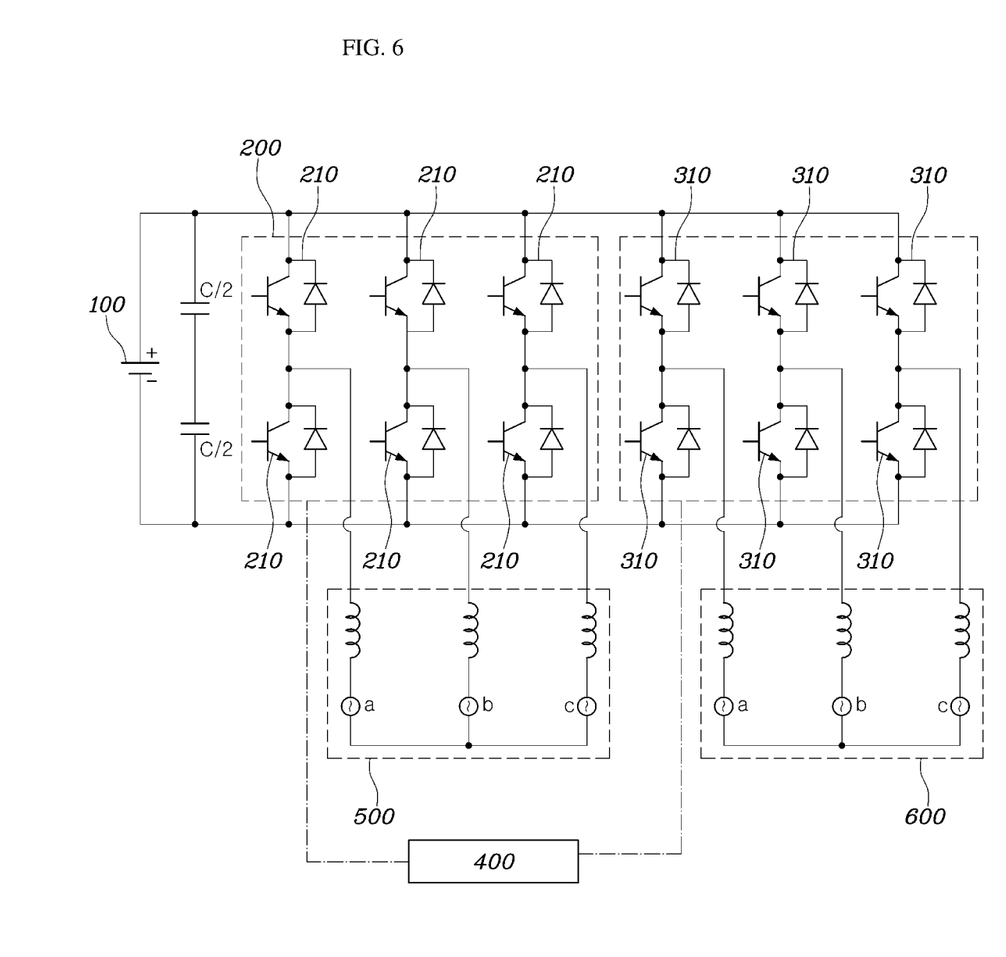
FIG. 6 is a diagram showing an inverter system according to another exemplary embodiment of the present disclosure.

On the other hand, as shown in FIG. 6, according to another exemplary embodiment of the present disclosure, the motor may include a first motor 500 driven by the power converted by the first inverter 200 and a second motor 600 driven by the power converted by the second inverter 300. In particular, as shown in FIG. 6, when the motor includes the first motor 500 and the second motor 600, the output terminals of the first inverter 200 may be connected respectively to the phases a, b, and c of the first motor 500 and the output terminals of the second inverter 300 may be connected respectively to the phases a, b, and c of the second motor 600. When the required output of the motor is less than a predetermined reference, the controller 400 may be configured to drive the first motor 500 by operating the first switching devices 210 to drive the first inverter 200. Particularly, when the required output of the motor is greater than the predetermined reference, the controller 400 may be configured to drive the second motor 600 by operating the second switching devices 310 to drive the second inverter 300.

Further, although not shown in detail in the figures, the inverter system for a vehicle according to the present disclosure may further include: an input voltage meter (not shown) configured to measure a voltage input to the first inverter 200 and the second inverter 300 from the energy storage 100; a voltage converter (not shown) configured to convert the voltage measured by the input voltage meter and input the converted voltage to the controller 400; an output current meter (not shown) configured to measure a current output from the first inverter 200 and the second inverter 300; and a current converter (not shown) configured to convert the current measured by the output current meter and input the converted current to the controller 400. In this configuration, voltage information data that is input to the inverter through the voltage converter and output current information data that is input through the current converter and output from the inverter may be used to operate the inverters under control of the controller 400.

What is claimed is:

1. An inverter system for a vehicle, comprising:
an energy storage configured to store electrical energy;
a first inverter that includes a plurality of first switching devices and configured to convert energy stored in the energy storage into alternating current (AC) power;
a second inverter that includes a plurality of second switching devices that are different in type from the first switching devices, and is connected to the energy storage in parallel with the first inverter, and configured to convert the energy stored in the energy storage into AC power;
a motor driven by the AC power converted by the first inverter and the second inverter; and
a controller configured to generate a pulse-width modulation (PWM) signal based on required output of the motor and configured to operate the motor by inputting the generated PWM signal to at least one of the first inverter or the second inverter,
wherein the first switching devices are silicon carbide-field effect transistors (SiC-FET) and the second switching devices are silicon-insulated gate bipolar transistors (Si-IGBT).

2. The inverter system of claim 1, wherein the controller is configured to drive the first inverter by inputting a PWM signal to the first switching devices when the required output of the motor is less than a predetermined reference.

3. The inverter system of claim 1, wherein the controller is configured to drive the second inverter by inputting a PWM signal to the second switching devices when the required output of the motor is greater than the predetermined reference.

4. The inverter system of claim 1, wherein when the required output of the motor is greater than a predetermined reference, the controller is configured to drive the first inverter and the second inverter by generating a first PWM signal and a second PWM signal and configured to input the first PWM signal to the first switching devices and the second PWM signal to the second switching devices.

5. The inverter system of claim 4, wherein the controller is configured to input the first PWM signal to the first switching devices and the second PWM signal to the second switching devices to turn on the second switching devices a predetermined time later than the first switching devices and turn off the second switching devices the predetermined time later than the first switching devices.

6. The inverter system of claim 5, wherein the predetermined time is ¼ of the cycle of the first PWM signal.

7. The inverter system of claim 4, wherein the controller is configured in put the second PWM signal to the first switching devices and the first PWM signal to the second switching devices to turn on the first switching devices a predetermined time later than the second switching devices and turn off the first switching devices the predetermined time later than the second switching devices.

8. The inverter system of claim 7, wherein the predetermined time is ¼ of the cycle of the first PWM signal.

9. The inverter system of claim 1, wherein the first inverter is smaller in switching and conduction loss than the second inverter.

10. The inverter system of claim 1, wherein the first inverter is smaller in rated output for driving the motor than the second inverter.

11. The inverter system of claim 1, wherein the motor is a single motor that is operated by selectively receiving power converted by the first inverter or power converted by the second inverter in accordance with the required output of the motor or by receiving both of the power converted by the first inverter and the power converted by the second inverter.

12. The inverter system of claim 1, wherein the motor includes a first motor that is driven by power converted by the first inverter and a second motor that is driven by power converted by the second inverter.

* * * * *